United States Patent
Nandiraju et al.

(10) Patent No.: US 9,031,409 B2
(45) Date of Patent: May 12, 2015

(54) SYSTEM AND METHOD FOR AVOIDING UPSTREAM INTERFERENCE IN RF-OVER-GLASS NETWORK

(75) Inventors: Nagesh S. Nandiraju, North Wales, PA (US); Dean A. Stoneback, Harleysville, PA (US); Amarildo J. C. Vieira, Philadelphia, PA (US)

(73) Assignee: ARRIS Technology, Inc., Suwanee, GA (US)

( * ) Notice: Subject to any disclaimer, the term of this patent is extended or adjusted under 35 U.S.C. 154(b) by 245 days.

(21) Appl. No.: 13/097,901

(22) Filed: Apr. 29, 2011

(65) Prior Publication Data
US 2012/0275792 A1    Nov. 1, 2012

(51) Int. Cl.
| H04J 14/00 | (2006.01) |
| --- | --- |
| H04B 10/2575 | (2013.01) |
| H04L 12/28 | (2006.01) |
| H04J 14/02 | (2006.01) |

(52) U.S. Cl.
CPC ...... *H04B 10/25751* (2013.01); *H04L 12/2801* (2013.01); *H04L 12/2861* (2013.01); *H04L 12/2874* (2013.01); *H04J 14/0247* (2013.01); *H04J 14/0252* (2013.01); *H04J 14/0257* (2013.01); *H04J 14/0282* (2013.01); *H04J 14/0298* (2013.01)

(58) Field of Classification Search
CPC ................ H04B 10/25751; H04J 14/0247
USPC .......................................................... 398/68
See application file for complete search history.

(56) References Cited

U.S. PATENT DOCUMENTS

| 6,577,414 | B1 |   | 6/2003 | Feldman et al. |
| 6,895,185 | B1 | * | 5/2005 | Chung et al. ..................... 398/72 |
| 6,922,431 | B1 | * | 7/2005 | Weber et al. ................... 375/130 |
| 7,088,921 | B1 | * | 8/2006 | Wood .............................. 398/67 |
| 7,333,495 | B2 |   | 2/2008 | Sala et al. |
| 7,421,206 | B2 |   | 9/2008 | Lee et al. |
| 7,515,830 | B2 | * | 4/2009 | Jang et al. ....................... 398/95 |

(Continued)

FOREIGN PATENT DOCUMENTS

GB    2294372 A    4/1996

OTHER PUBLICATIONS

D. Pisano, "Determining the feasibility of a method for improving bandwidth utilization of cable networks," Masters Thesis, Rochester Institute of Technology, Jul. 2010.

(Continued)

*Primary Examiner* — Ken Vanderpuye
*Assistant Examiner* — Amritbir Sandhu
(74) *Attorney, Agent, or Firm* — Stewart M. Wiener

(57) ABSTRACT

A headend communications device communicates via a network to downstream network elements, such as cable modems coupled behind optical network units, and allocates and grants timeslots for upstream transmissions from the network elements. The headend communications device has a scheduler for managing and controlling timeslot allocations in a manner avoiding interference such as optical beat interference or FM carrier collisions. The scheduler identifies two or more cable modems or like customer network elements served by the headend communications device that will cause at least a pre-determined intolerable level of interference when allocated overlapping timeslots for upstream transmissions and prevents these two or more cable modems or network elements from being allocated and granted overlapping timeslots.

19 Claims, 7 Drawing Sheets

(56) References Cited

U.S. PATENT DOCUMENTS

| | | | |
|---|---|---|---|
| 7,616,654 B2* | 11/2009 | Moran et al. | 370/431 |
| 8,005,095 B2 | 8/2011 | Emmendorfer et al. | |
| 8,036,530 B2 | 10/2011 | Arnold et al. | |
| 2002/0018494 A1 | 2/2002 | Vieira et al. | |
| 2002/0080439 A1 | 6/2002 | Stoneback et al. | |
| 2003/0015710 A1 | 1/2003 | Vieira et al. | |
| 2003/0015712 A1 | 1/2003 | Vieira et al. | |
| 2003/0031224 A1 | 2/2003 | Litvin et al. | |
| 2003/0034538 A1 | 2/2003 | Brophy et al. | |
| 2003/0114112 A1 | 6/2003 | Strater et al. | |
| 2003/0161637 A1* | 8/2003 | Yamamoto et al. | 398/167.5 |
| 2005/0175354 A1 | 8/2005 | Vieira et al. | |
| 2006/0002706 A1* | 1/2006 | Lee et al. | 398/71 |
| 2006/0098697 A1 | 5/2006 | Kim et al. | |
| 2006/0115271 A1 | 6/2006 | Hwang et al. | |
| 2006/0127092 A1* | 6/2006 | Jang et al. | 398/70 |
| 2006/0133805 A1 | 6/2006 | Jang et al. | |
| 2006/0148406 A1 | 7/2006 | Strater et al. | |
| 2006/0211441 A1* | 9/2006 | Mese et al. | 455/522 |
| 2007/0129043 A1 | 6/2007 | Vieira et al. | |
| 2007/0147848 A1 | 6/2007 | Vieira et al. | |
| 2007/0177873 A1* | 8/2007 | Hyun et al. | 398/72 |
| 2007/0258713 A1* | 11/2007 | Jung et al. | 398/71 |
| 2008/0152125 A1 | 6/2008 | Stoneback et al. | |
| 2008/0304828 A1* | 12/2008 | Mizutani et al. | 398/78 |
| 2009/0010276 A1* | 1/2009 | Yonge et al. | 370/447 |
| 2009/0092394 A1* | 4/2009 | Wei et al. | 398/79 |
| 2009/0249417 A1 | 10/2009 | Goguen et al. | |
| 2009/0317091 A1 | 12/2009 | Vogel | |
| 2010/0083330 A1* | 4/2010 | Bernstein et al. | 725/111 |
| 2010/0104287 A1* | 4/2010 | Biegert et al. | 398/67 |
| 2010/0111543 A1* | 5/2010 | Chow et al. | 398/194 |
| 2010/0142949 A1 | 6/2010 | Mysore et al. | |
| 2010/0150557 A1 | 6/2010 | Mysore et al. | |
| 2010/0162337 A1 | 6/2010 | Lee et al. | |
| 2010/0220994 A1* | 9/2010 | Pradzynski et al. | 398/1 |
| 2010/0239251 A1 | 9/2010 | Biegert et al. | |
| 2010/0254708 A1 | 10/2010 | Pradzynski et al. | |
| 2010/0272447 A1* | 10/2010 | Kolze et al. | 398/192 |
| 2011/0033189 A1* | 2/2011 | Biegert et al. | 398/115 |
| 2011/0239266 A1 | 9/2011 | Brooks | |
| 2012/0014696 A1 | 1/2012 | Sniezko | |
| 2012/0051734 A1 | 3/2012 | Weiss et al. | |
| 2012/0106964 A1 | 5/2012 | Sniezko | |
| 2012/0141129 A1* | 6/2012 | Chen et al. | 398/66 |
| 2012/0275792 A1* | 11/2012 | Nandiraju et al. | 398/66 |
| 2013/0129355 A1* | 5/2013 | Tien et al. | 398/72 |
| 2013/0188954 A1* | 7/2013 | Lanza et al. | 398/68 |

OTHER PUBLICATIONS

Motorola, Inc,. "Leveraging RFoG to Deliver DOCSIS® and GPON Services over Fiber," White Paper, 2008.

D. Cox, "National Broadband Network: Submission to Senate Select Committee," C-COR Broadband, Feb. 2009.

Society of Cable Telecommunications Engineers, "Radio Frequency over Glass Fiber-to-the-Home Specification", SCTE 174 2010, pp. 1-32, 2010 (month unknown).

* cited by examiner

SYSTEM AND METHOD FOR AVOIDING UPSTREAM INTERFERENCE IN RF-OVER-GLASS NETWORK

FIELD

A network is generally disclosed, and more particularly, a cable modem termination system at the headend of the network and methods for preventing interference with respect to upstream transmissions received at the headend are provided.

BACKGROUND

A communications device such as a cable modem termination system (CMTS) is typically provided at a headend or hub site of a broadband network for providing high speed data services such as Internet, Voice over Internet Protocol, or digital video services to subscribers of a cable TV operator or to like customers. The CMTS hosts downstream and upstream ports and contains numerous receivers, each receiver handling communications between hundreds of end user network elements connected to the broadband network. Examples of network elements include cable modems, set top boxes, televisions equipped with set top boxes, Data Over Cable Service Interface Specification (DOCSIS) terminal devices, media terminal adapters (MTA), embedded media terminal adapter (eMTA), and the like. An example of a CMTS is the Motorola Broadband Service Router 64000 (BSR 64000).

Data Over Cable Service Interface Specification (DOCSIS) is a cable modem standard used for transferring data over a cable TV network. The CMTS carries IP traffic (downstream traffic) destined for cable modems and like network elements. The downstream traffic is carried in IP packets encapsulated in MPEG transport stream packets carried on data streams that are typically modulated onto a TV channel.

DOCSIS specifies that cable modems and like network elements obtain upstream bandwidth according to a request/grant scheme. A cable modem sends a bandwidth allocation request when subscriber network devices need to send traffic upstream into the network. The CMTS grants these requests using bandwidth grant messages. Thus, the CMTS must arbitrate bandwidth among a plurality of network elements such as set top boxes and cable modems configured for bi-directional communications. Upstream data (data from cable modems to the headend or Internet) is carried in Ethernet frames encapsulated inside DOCSIS frames using time-division multiple access (TDMA) sharing mechanisms.

The CMTS can be used to serve customers on a Hybrid Fiber-Coaxial (HFC) broadband network, a Radio Frequency over Glass (RFoG) broadband network, or a mixed HFC and RFoG network. Traditionally, cable TV operators have used HFC broadband networks combining the use of optical fiber and coaxial cable. The fiber optic portion of such a network extends from the headend to a hub and/or to a fiber optic node. Various services of the operator may be encoded, modulated and upconverted onto RF carriers, combined onto a single electrical signal, and inserted into an optical transmitter at the headend. The optical transmitter converts the electrical signal to a downstream optically modulated signal that is transmitted to the nodes. The node may be connected to many network elements of subscribers via the coaxial cable portion of the network. By way of example, a single node may be connected to thousands of cable modems or other network elements.

Each node includes a broadband optical receiver which converts the downstream optically modulated signal received from the headend/hub to an electrical signal provided to the subscribers' network elements via the coaxial portion of the HFC network. Each node may also contain a reverse/return path transmitter that is able to relay communications from a subscriber to the headend. Thus, the HFC network uses optical fiber for communications between the headend and nodes and coaxial cable for communications between the nodes and the end user network elements. Downstream (also referred to as forward path) optical communications over the optical fiber are typically converted at the nodes to Radio Frequency (RF) communications for transmission over the coaxial cable. Conversely, upstream (also referred to as return path) RF communications from the network elements are provided over the coaxial cables and are typically converted at the nodes to optical communications for transmission over the optical fiber to the headend.

As an alternative to the above referenced HFC system, a cable TV operator may also use Radio Frequency over Glass (RFoG) systems to deliver the same services as an RF/DOCSIS/HFC network. RFoG and HFC systems can concurrently operate out of the same headend/hub, permitting RFoG to be a solution for node splitting and capacity increases on an existing HFC network. RFoG permits the continued use of traditional HFC equipment and back-office applications with fiber-to-the-premise deployments. Thus, use of existing CMTS platforms, headend equipment, set-top boxes, and cable modems can continue while gaining benefits inherent with RFoG systems.

In an RFoG system, RFoG optical networking units (R-ONUs) terminate the fiber connection at a subscriber-side interface and convert traffic for delivery over the in-home network at the customer premises. For example, the R-ONU may connect to set-top boxes, cable modems, or like network elements via coaxial cable, and one or more of the cable modems may connect to the subscriber's internal telephone wiring and/or to personal computers or like devices via Ethernet or Wi-Fi connections. The return path for voice, data, video, and like upstream traffic from a cable modem or like network device is through the R-ONU which converts the upstream signal to an optical upstream signal and which transmits the optical upstream signal to the return path RFoG optical receiver at the headend or hub. The RFoG optical receiver converts the upstream optical signal at the headend to an RF electrical signal for the CMTS.

Accordingly, R-ONUs convert optical signals from the headend into electrical signals at the customer premises and thereby terminate the RFoG system at the subscriber-side interface. This is accomplished in place of the same function traditionally performed back at the higher-level serving area optical nodes in the HFC network. The RF infrastructure remains in place; the difference is that the optic fiber termination is moved from an optical fiber node of the HFC network to the R-ONU at the customer premises. By way of example, the R-ONU can be located at a single home, a business, a multi-tenant dwelling (MTU/MDU) or an individual living unit within an MTU.

Although RFoG systems provide a possible capacity increase relative to traditional HFC systems, an undesired effect of an RFoG system is the potential for upstream interference that may occur when more than one R-ONU has the optical return path activated at any given time. For example, when amplitude modulation (AM) is used in the upstream path and optical upstream signals are received by the RFoG optical receiver at the headend corresponding to overlapping transmissions or bursts from multiple R-ONUs of about the same wavelength or of close wavelengths, an optical collision or optical beating may occur and cause optical beat interference (OBI). OBI is a signal degradation mechanism in systems using amplitude modulation that occurs when two or more lasers with closely-spaced optical frequencies or wavelength transmit into optical fiber and mix together in the RFoG optical receiver causing splatter in the RF spectrum. The impact of OBI is packet loss, i.e. the transmissions received via the R-ONUs cannot be properly demodulated at the headend. This may particularly be a problem if the bursts or transmissions contain voice packets. In systems that use frequency modulation (FM) in the upstream path, any overlap of transmissions from different R-ONUs may cause upstream interference, even if the transmit wavelengths are far apart.

In Data Over Cable Service Interface Specification (DOCSIS) 2.0 deployments, cable modems are capable of transmitting in only a single channel at a time (i.e., no channel bonding capability). Thus, for multiple cable modems in an RFoG system to transmit simultaneously requires the cable modems to be tuned to different RF channels. This is a common practice for purposes of increasing throughput and thus OBI and upstream interference are a potential problem. In DOCSIS 3.0 deployments, cable modems have upstream channel bonding capability and are therefore able to simultaneously transmit in different RF channels. The resulting simultaneous use of multiple channels by different cable modems in an RFoG system and increased usage of networks further enhance a likelihood of OBI, upstream interference, and modulation errors.

SUMMARY

This disclosure describes a headend communications device for communicating via a network to downstream network elements, such as cable modems and like customer network elements, and for allocating and granting timeslots for upstream or return path transmissions from the network elements. The headend communications device has a scheduler for managing and controlling timeslot allocations for the optical upstream transmissions from network elements coupled to optical network units in a manner avoiding interference or optical beat interference. The scheduler identifies two or more network elements served by the headend communications device that will cause at least a pre-determined intolerable level of interference when allocated overlapping timeslots and prevents these two or more network elements from being allocated and granted overlapping timeslots.

This disclosure also describes a method of preventing an intolerable amount of interference from upstream or return path transmissions from network elements, such as cable modems and the like, over an RF-over-Glass (RFoG) network operating under Data Over Cable Service Interface Specification (DOCSIS) standards. A scheduler in a CMTS classifies at least one of a set of network elements coupled to optical network units as causing a pre-determined intolerable level of interference when allocated overlapping timeslots and a set of network elements coupled to optical network units unable to cause the pre-determined intolerable level of interference when allocated overlapping timeslots. Based on this information, the scheduler prevents the CMTS from granting allocation of overlapping timeslots to two or more of the network elements that will cause at least the pre-determined intolerable level of interference when permitted to transmit simultaneously.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

As suggested above, it is possible for a broadband DOCSIS network of a cable operator to include Hybrid Fiber-Coaxial (HFC) and Radio Frequency over Glass (RFoG) mixed network deployments and it is also possible for a single CMTS or CMTS card to simultaneously serve customers connected to the HFC and RFoG portions of the network. For purposes of this disclosure, a cable modem network element connected to the HFC portion of the network may simply be referenced as a "CM" and a cable modem network element connected to the RFoG portion of the network may be referred to as an "R-CM".

Since an R-CM as defined above is a cable modem connected to the RFoG portion of the network, it will receive downstream transmissions from the headend and will send upstream transmissions to the headend via an RFoG Optical Network Unit (R-ONU). The R-ONU converts downstream optical signals from the headend to electric signals for the customer premises network elements, such as the R-CM, and converts upstream communications from the customer premise network elements to optical signals or bursts via a laser or the like over a fiber optic cable. The customer premises network element (i.e., R-CM) may be integrated directly with the R-ONU or may be a separate device coupled to the R-ONU via coaxial cable or the like. The R-ONU may be coupled to more than one customer premises network element such as any combination of cable modems, set top boxes, or like network elements.

Figure 1:
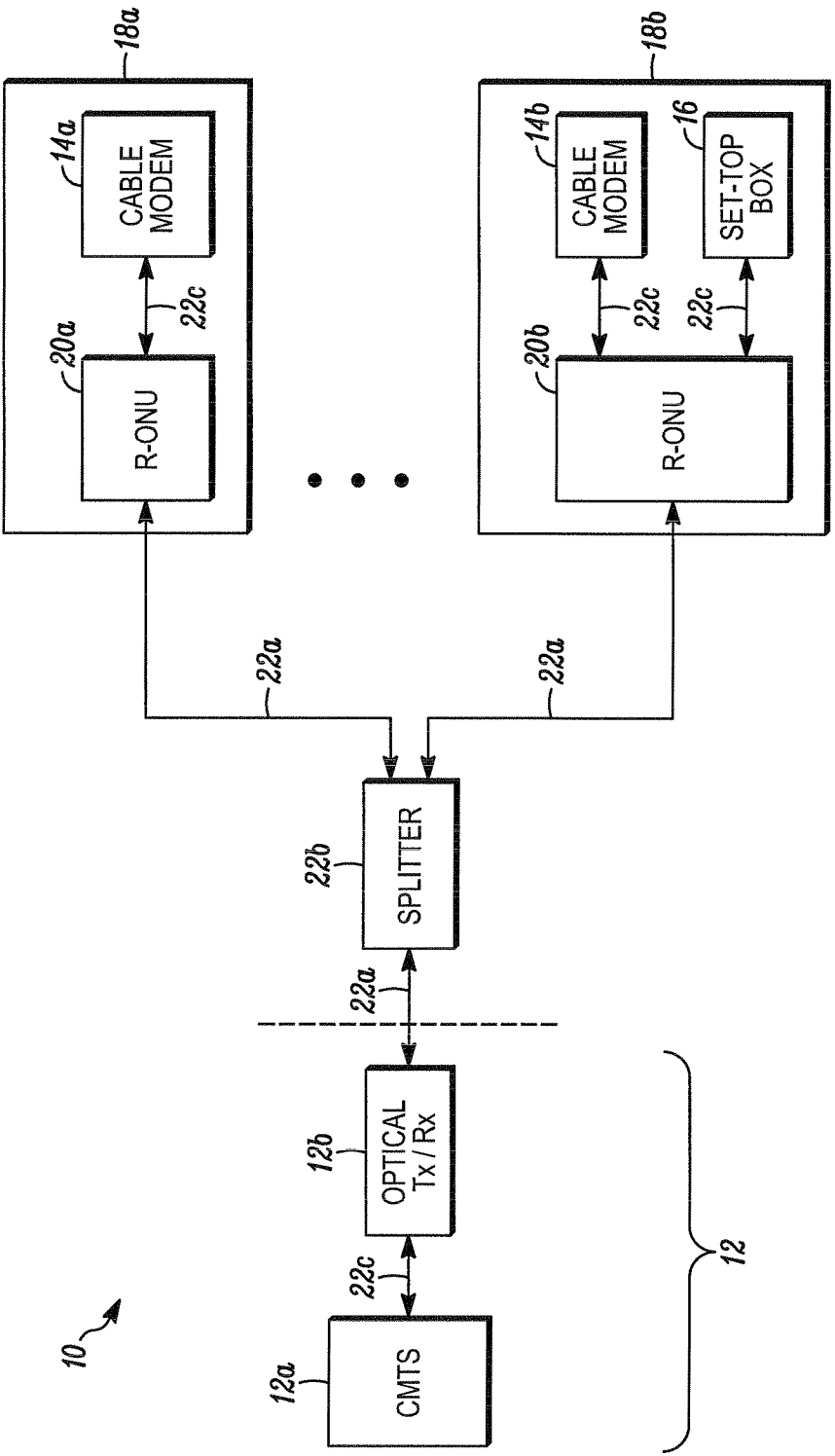
FIG. 1 is a block diagram of a Radio Frequency over Glass (RFoG) network.

For purposes of example, FIG. 1 illustrates an RFoG portion of a network 10 including a CMTS 12a and an optical transmitter/receiver 12b located at the headend or hub 12 of the network 10 and cable modems 14a and 14b and set top box (STB) 16 present at different customer or subscriber locations 18a and 18b. The cable modems 14a and 14b and STB 16 are served by the same CMTS 12a. Each of the cable modems 14a and 14b and STB 16 is connected to, or integrated with, an R-ONU, 20a and 20b, at the customer or subscriber locations 18a and 18b. The R-ONUs 20a and 20b can be connected to a home network or any number of settop-boxes, cable modems and like customer network elements. The optical transmitter/receiver 12b converts downstream RF signals from the CMTS 12a into an optical signal transmitted across fiber optic cables 22a to the R-ONUs 20a and 20b typically via one or more splitters or taps 22b. The R-ONUs 20a and 20b convert the downstream optical signal into an RF signal for the cable modems 14a and 14b and STB 16. Typically, the connection between the R-ONUs 20a and 20b and the cable modems 14a and 14b and STB 16 is provided by coaxial cable 22c. The return path or upstream transmissions are the reverse of that described above.

The CMTS at the headend of a network arbitrates bandwidth for upstream communications from a plurality of network elements and includes multiple schedulers each managing upstream communications on one or more upstream RF channels. These schedulers inform cable modem network elements when they are permitted to send upstream transmissions to the headend. The transmissions may be of different types or class, such as voice, data, control, gaming, video or the like. Typically, the schedulers are in the form of software loaded in processors or the like on a circuit board of the CMTS.

For networks operating under DOCSIS 3.0 standards, upstream channel bonding is supported thereby requiring each single channel scheduler to coordinate with other schedulers to manage allocations of timeslots across multiple RF channels. With respect to cable modems connected to a HFC portion of a broadband network, it is common for different cable modems (CMs) to be allocated overlapping timeslots in different RF channels. Here, optical beating or interference is not a problem because the CMs are sending electric signals to an optical node that can receive the signals and transmit optical signals without interference. However, with respect to cable modems connected to an RFoG portion of a network, Optical Beat Interference (OBI) (for systems using amplitude modulation (AM) in the return path) and/or upstream interference (for systems using frequency modulation (FM) in the return path) present potential problems. Thus, upstream optical bursts emanating from R-ONUs into optical fiber of the network should not be handled in the same fashion as upstream transmissions from cable modems connected to the HFC portion of a network.

Figure 2:
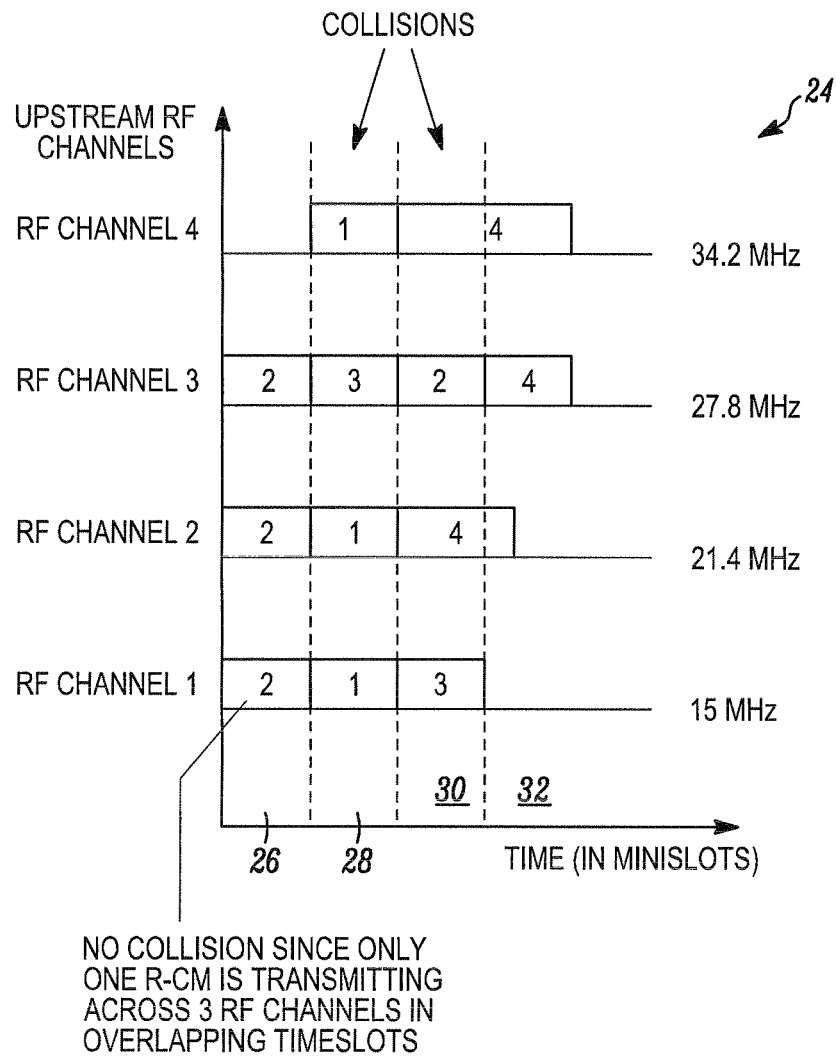
FIG. 2 is a typical timeslot diagram showing overlapping timeslots for upstream transmissions to a CMTS.

FIG. 2 provides an example with respect to experiencing an OBI problem in a DOCSIS RFoG deployment using amplitude modulation (AM) in the return path. In this example, the diagram 24 of FIG. 2 identifies four separate upstream RF-channels 1-4 on the Y-axis and four separate timeslots 26, 28, 30 and 32 on the X-axis. The timeslots 26, 28, 30 and 32 are allocated by the CMTS to the CMs (cable modems connected to the HFC portion of a network) and R-CMs (cable modems connected to an RFoG portion of the network) that are served by the CMTS, and each timeslot defines when data, voice or other types or classes of upstream transmissions can be sent into the network to the headend. The timeslots in FIG. 2 are identified for use by four different cable modems connected to the RFoG portion of the network (R-CM 1, R-CM 2, R-CM 3 and R-CM 4).

For purposes of the example shown in FIG. 2, the wavelengths of the upstream bursts from the R-ONUs associated with R-CM 1, R-CM 2 and R-CM 3 are considered sufficiently close as to be able to induce OBI and cause modulation errors at the CMTS. In contrast, the wavelength of the upstream bursts from the R-ONU associated with R-CM 4 is sufficiently spaced from the wavelengths of the R-ONUs associated with R-CM 1, R-CM 2 and R-CM 3 as to not cause OBI when overlapping timeslots of the R-CMs are allocated.

The first timeslot 26 shown in FIG. 2 represents a successful transmission. Here, R-CM 2 is allocated across three of the four upstream channels. In the fourth timeslot 32, the same result is obtained because only R-CM 4 is allocated. However, the same is not true for timeslots 28 and 30. In timeslot 28, R-CM 1 is allocated three of the RF channels while R-CM 3 is allocated one of the RF channels. Since the wavelengths of the bursts output from the R-ONUs of R-CM 1 and R-CM 3 are close, the transmissions received by the optical receiver at the headed result in an intolerable amount of OBI and cause modulation errors. The same is true of timeslot 30 in which R-CM 2 and R-CM 3 are allocated different ones of the RF channels resulting in an intolerable amount of OBI and burst losses. In timeslot 30, the burst from the R-ONU associated with R-CM 4 does not contribute to OBI because its wavelength is sufficiently spaced from wavelengths of the R-ONUs of the other cable modems.

Figure 3:
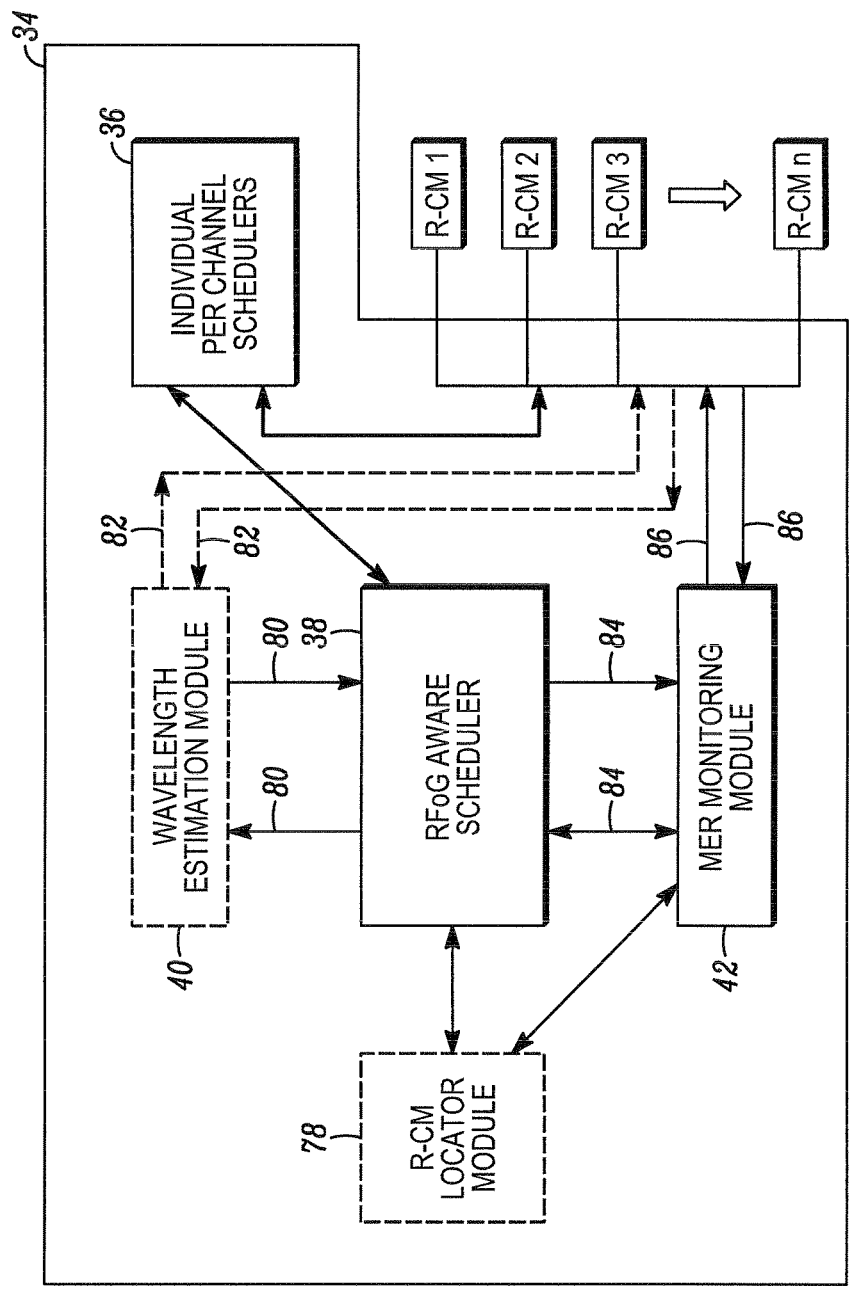
FIG. 3 is a block diagram of a CMTS for mitigating upstream interference in a DOCSIS/RFoG network.

FIG. 3 illustrates a cable modem termination system (CMTS) or like headend communications device 34 that mitigates, minimizes or prevents OBI and upstream interference in DOCSIS networks having RFoG deployments. "R-CM 1" to "R-CM n" are cable modems or like customer network elements schematically illustrated in the lower right-hand corner of FIG. 3 and each one is located at a customer premises and is connected to an RFoG portion of the broadband network. The remaining portion of FIG. 3 illustrates the CMTS 34 which is located at the headend of the broadband network. Simply for ease of illustration, the optical transmitter/receiver at the headend and R-ONUs at the customer locations are omitted in FIG. 3; however, it should be understood that R-ONUs and the optical transmitter/receiver would be required and present, for instance, as shown in FIG. 1.

The CMTS 34 includes per-channel-schedulers 36 which can represent one scheduler per RF upstream channel. The CMTS 34 also includes an auxiliary scheduler 38 referred to as an "RFoG Aware Scheduler" in FIG. 3. While the schedulers 36 and 38 are shown as being separate, they can be embodied as a single scheduler, for instance, as code or software loaded in one or more processors of the CMTS. The auxiliary scheduler 38 identifies so-called "interfering" RFoG cable modems (R-CMs) and ensures that two or more interfering cable modems (R-CMs) on the RFoG portion of the network are not allocated to transmit in the upstream RF channels in overlapping timeslots. For purposes of this disclosure, the term "interfering R-CMs" is defined as cable modems that are connected to an RFoG portion of a network coupled behind different R-ONUs and that cause their associated R-ONUs to transmit upstream optical signals of very close or overlapping wavelengths capable of causing a predetermined intolerable amount of OBI or interference if permitted to transmit simultaneously. It should be understood that two or more cable modems coupled behind the same R-ONU do not fit this definition and can be allocated overlapping timeslots. Also, it should be understood that CMs on the HFC network do not fit this definition and can be allocated overlapping time slots.

For purposes of identifying interfering R-CMs and for minimizing a loss of throughput on a highly utilized network due to the need for mutually exclusive allocations on separate RF channels, the CMTS 34 can include at least one of a wavelength estimation module (WEM) 40 and a modulation error rate (MER) monitoring module 42. At least one of these modules, 40 or 42, works in conjunction with the auxiliary scheduler 38 to determine the scheduling of R-CMs as explained below in greater detail. Thus, for all allocations to be made by the CMTS 34 involving an upstream transmission originating from a R-CM, the per channel schedulers 36 consult the auxiliary scheduler 38 to manage and control timeslot allocation for the R-CMs in individual channels. In turn, the auxiliary scheduler 38 utilizes information from the wavelength estimation module 40 or MER monitoring module 42 to make determinations with respect to interfering and non-interfering R-CMs.

In HFC and RFoG mixed deployments, the auxiliary scheduler 38 maintains several pre-determined rules for allocating timeslots to R-CMs (cable modems connected to the RFoG portion of the network). In one contemplated embodiment, the wavelength estimation module 40 or MER monitoring module 42 provides a series or matrix of lists, sets, or groups of potentially interfering R-CMs to the auxiliary scheduler 38, and based on the pre-determined rules, the auxiliary scheduler 38 determines the best scheduling combination of cable modems (R-CMs) connected to the RFoG portion of the network and cable modems (CMs) connected to the HFC portion of the network that desire upstream transmissions be made to the CMTS 34. Depending upon the mode of operation, the auxiliary scheduler 38 may attempt to minimize the overlap of R-CM allocations, prevent the overlap of R-CM allocations, or allocate overlapping timeslots only to R-CMs associated with R-ONUs that produce optical signals having greatest separation of wavelengths or at least a desired amount of separation.

In a so-called "mutually exclusive" mode of operation, the auxiliary scheduler 38 may permit only one R-CM and multiple HCF CMs to be assigned overlapping timeslots in different upstream RF channels at any given time. However, if the network is determined to be in a period of high use, the auxiliary scheduler 38 may abandon this "mutually exclusive" rule and select R-CMs (cable modems connected to the RFoG portion of the network) coupled behind different R-ONUs having furthest separation of wavelengths, or at least a desired amount of separation, for allocation of overlapping timeslots of the R-CMs.

In an RFoG network deployment in which amplitude modulation (AM) is used in the upstream path, the auxiliary scheduler 38 may allocate overlapping timeslots for R-CMs (cable modems connected to the RFoG portion of the network) coupled behind different R-ONUs provided that the overlapping transmissions are not from "interfering R-CMs" as defined above. For instance, overlapping timeslots may be allocated provided that the two or more R-CMs are coupled behind R-ONUs able to transmit optical signals in overlapping timeslots to the headend and be successfully demodulated at the headend. Of course, this requires that the transmit wavelengths of the associated R-ONUs are sufficiently spaced apart as to not cause a predetermined intolerable amount of OBI. The phrase "predetermined intolerable amount" refers to a threshold amount or percentage of errors, such as modulation errors, deemed to be unacceptable as determined by a particular network operator. Of course, different operators may set this threshold at significantly different levels. For example, errors reaching an amount of 1% may be deemed unacceptable to a particular operator and may define the threshold level, whereas the threshold level may be set by other network operators at 0.1%, 3%, or any other level deemed appropriate by the particular network operator.

In addition, some network operators may prefer grants for voice and control messages to be handled differently than grants for transmissions of data or other types or classes of transmissions. Thus, while upstream data transmissions may be allocated overlapping timeslots by the CMTS 34, other types or classes of upstream transmissions from R-CMs may not be allocated with overlapping timeslots. Accordingly, in some contemplated modes of operation, the auxiliary scheduler 38 may allocate mutually exclusive timeslots for selected types of transmissions while permitting overlapping allocations for other types.

Figure 4:
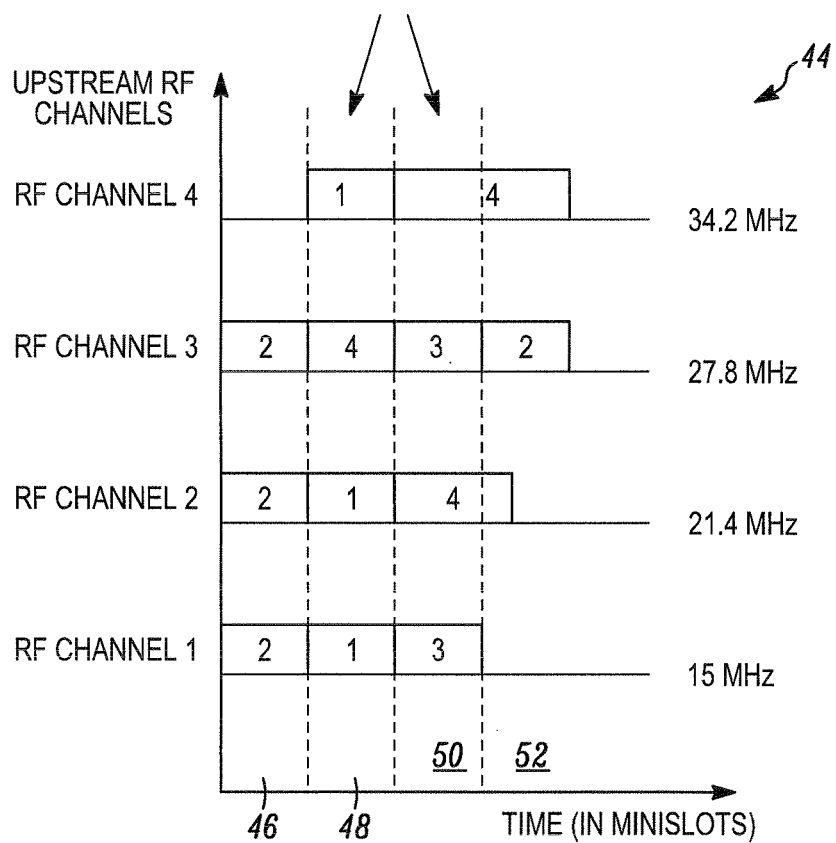
FIG. 4 is a typical timeslot diagram showing overlapping timeslots for upstream transmissions to the CMTS of FIG. 3.

FIG. 4 provides a timeslots diagram 44 similar to that of FIG. 2 discussed above. The diagram 44 of FIG. 4 identifies four separate upstream RF-channels 1-4 on the Y-axis and four separate timeslots 46, 48, 50 and 52 along the X-axis. The timeslots 46, 48, 50 and 52 are allocated by the per channel schedulers 36 in consult with the auxiliary scheduler 38 of the CMTS 34 to the CMs (cable modems on the HFC portion of the network) and R-CMs (cable modems on the RFoG portion of the network coupled behind R-ONUS) that are served by the CMTS 34 and that desire an upstream transmission. The timeslots in FIG. 4 are shown allotted for use by four different cable modems on the RFoG portion of the network (R-CM 1, R-CM 2, R-CM 3 and R-CM 4). For purposes of this example, the wavelengths of bursts from the R-ONUs associated with R-CM 1, R-CM 2 and R-CM 3 are considered sufficiently close to induce OBI and cause modulation errors at the CMTS 34 whereas the wavelength of bursts from the R-ONU of R-CM 4 is sufficiently spaced from the wavelength of bursts from the R-ONU of R-CM 1, R-CM 2 and R-CM 3 as to not cause an intolerable amount of OBI with any simultaneous transmission originating from R-CM 1, R-CM 2 or R-CM 3.

The first timeslot 46 shown in FIG. 4 represents a successful transmission because only R-CM 2 is allotted across the upstream channels. In the second through fourth timeslots, 48, 50 and 52, multiple different R-CMs have been allocated overlapping timeslots and thus their associated R-ONUs will convert the upstream transmissions of the R-CMs into optical signals that are received simultaneously by the optical receiver at the headend. However, all transmissions are successful. This is because the auxiliary scheduler 38 of CMTS 34 has pre-identified R-CM 1, R-CM 2 and R-CM 3 as interfering R-CMs that are not to be allocated overlapping timeslots and has pre-identified R-CM 4 as being non-interfering with each of R-CM 1, R-CM 2 and R-CM 3. Thus, in timeslot 48, the simultaneous and overlapping bursts from the R-ONUs associated with R-CM 1 and R-CM 4 are permitted since the wavelength of the burst from the laser of the R-ONU associated with R-CM 4 is sufficiently spaced from the wavelength of the burst from the R-ONU associated with R-CM 1 and either no OBI results or only a low acceptable amount of OBI is experienced. In timeslots 50 and 52, the simultaneous and overlapping bursts from the R-ONUs associated with R-CM 3 and R-CM 4, or R-CM 2 and R-CM 4 are permitted for the same reason. However, there is no timeslot in FIG. 4 that has any simultaneous or overlapping transmissions originating from R-CM 1, R-CM 2 and R-CM 3 because the auxiliary scheduler 38 of the CMTS 34 does not permit such an allocation.

As discussed above, the CMTS 34 may include a wavelength estimation module 40 that communicates with the auxiliary scheduler 38 and with the R-CMs. See links 80 and 82 in FIG. 3. In this embodiment, each of the R-ONUs (not shown in FIG. 3 but associated with the R-CMs shown in FIG. 3) periodically communicates its wavelength information to the wavelength estimation module 40. This communication is provided by the link 82 which may represent an in-band channel, an out-of-band channel, a combination of both, or the like.

The wavelength estimation module 40 embedded within the CMTS 34 collects the transmit wavelength information received from the R-ONUs associated with each R-CM served by the CMTS 34 and estimates wavelength of each R-ONU based on this information. In addition, the module 40 evaluates the expected OBI level that would result from simultaneous transmissions received due to overlapping allocations of various R-CMs. In this manner, the module 40 is able to determine which R-CMs should not be allocated with overlapping timeslots. The wavelength estimation module 40 provides the results of this analysis to the auxiliary scheduler 38 so that the auxiliary scheduler 38 can properly allocate timeslots between the R-CMs in a manner mitigating or minimizing OBI and upstream interference as discussed above.

Figure 5:
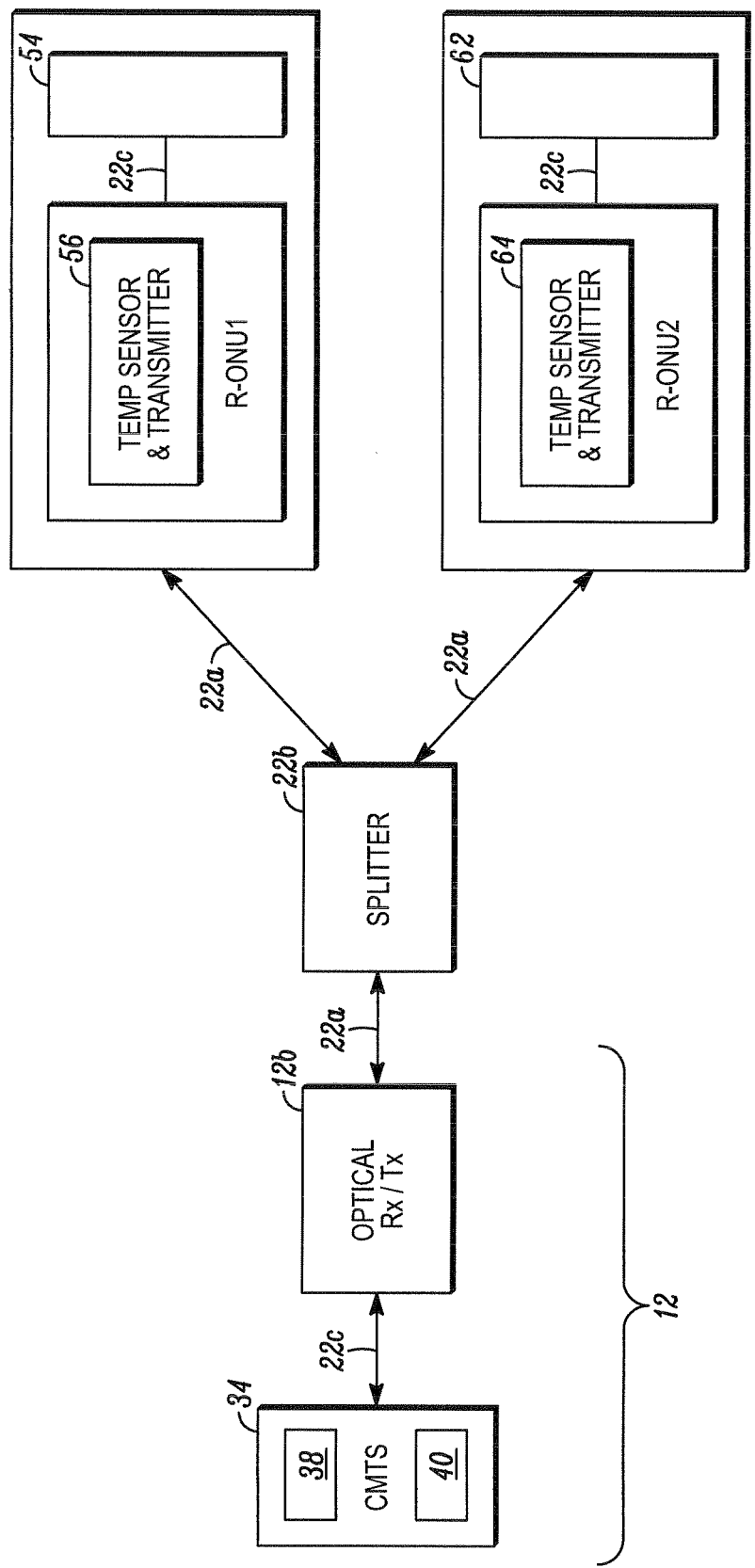
FIG. 5 is a block diagram of the Wavelength Estimation Module (WEM) of the CMTS of FIG. 3.

By way of example, the module 40 may estimate the wavelength of an upstream optical signal from an R-ONU coupled to a particular R-CM by sensing the temperature of the R-ONU. FIG. 5 illustrates such an embodiment. The cable modem 54 is coupled behind an R-ONU1, and the R-ONU1 has a temperature sensor and transmitter module 56. A 25° C. transmit wavelength, for instance, of the R-ONU1 may be embedded into the flash memory on a board or chip of the R-ONU1. In addition, the temperature sensor of the R-ONU1 has the ability to sense the current operating temperature of the R-ONU1. Thus, the 25° C. transmit wavelength and the current operating temperature can be communicated to the wavelength estimation module 40. The same is true for cable modem 62 coupled behind an R-ONU2 having a temperature sensor and transmitter module 64. As an alternative to sensing temperature of the R-ONU, other laser-transmit parameters could be monitored and used to estimate the wavelength of an upstream optical signal from the R-ONU. For example, laser bias current could be sensed and communicated to the wavelength estimation module 40.

The wavelength estimation module 40 may use or be programmed with a wavelength estimation algorithm that predicts the wavelengths of bursts from R-ONU1 and R-ONU2. For example, the module 40 is input with information such as the 25° C. transmit wavelength and the current operating temperature from each R-ONU and determines and outputs an estimated "current" wavelength based on the input information. This estimated current wavelength information can be interpreted by the module 40 or the auxiliary scheduler 38 in determining which pairs or sets of R-CMs can be allocated overlapping timeslots and which cannot.

As an alternate to the module 40, or in addition to the module 40, the CMTS 34 can include the MER monitoring module 42 which can receive and analyze transmissions from the R-CMs and provide relevant information to the auxiliary scheduler 38 by way of a feedback loop. See links 84 and 86 shown in FIG. 3. The module 42 can be used to continuously monitor for modulation errors, modulation error rate (MER), bit error rate (BER), preamble losses, codeword errors, RF spectrum and/or optical spectrum of upstream transmissions received by the CMTS or other device at the headend of the network and thereby be able to determine when a predetermined threshold level of such errors or interference has been reached.

In one contemplated embodiment, the MER monitoring module 42 can be used to toggle the auxiliary scheduler 38 to operate between different modes of operation. In a so-called "high-throughput" mode, the auxiliary scheduler 38 of the CMTS 34 is permitted to attempt to assign overlapping timeslots in different upstream channels to different R-CMs (cable modems connected to the RFoG portion of a network). If the bit error rate (BER) or other measurement made by the module 42 is determined to increase to a pre-determined threshold value based on the overlapping timeslots, the MER monitoring module 42 can automatically toggle the auxiliary scheduler 38 from the "high-throughput" mode to a so-called "high-resilience" mode of operation at the granularity of a grant. In the "high-resilience" mode, the auxiliary scheduler 38 allocates timeslots such that there is no overlap of different R-CMs (i.e., only mutually exclusive timeslot allocations are provided for cable modems connected to the RFoG portion of the network). After a given time period or based on additional BER or like measurements by the module 42, the auxiliary scheduler 38 can be automatically toggled back to the "high-throughput" mode. There is also a special mode of operation under "high-throughput" termed "high throughput with selected protection" in which the network operator is permitted to select a specific type or class of upstream transmission from a cable modem (R-CM) coupled behind an R-ONU to be given only mutually exclusive timeslot allocations by the CMTS with respect to all other R-CMs coupled behind different R-ONUs. The type or class of upstream transmission may be voice flows, gaming flows, or other pre-defined type of transmission.

Figure 6:
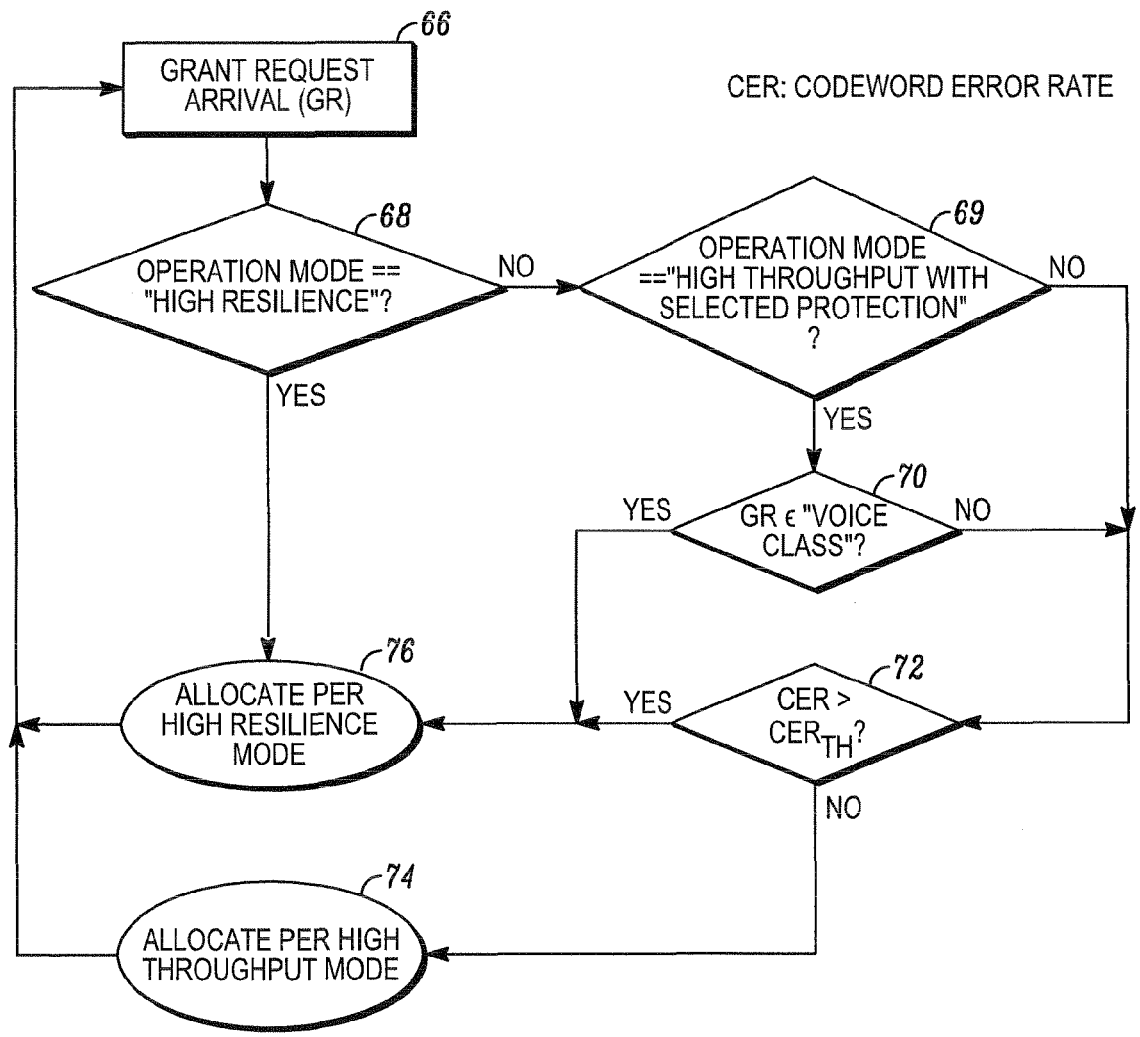
FIG. 6 is a state diagram of the Modulation Error Rate (MER) Monitoring Module of the CMTS of FIG. 3.

FIG. 6 provides one contemplated example of a state diagram of the mode of operations of the auxiliary scheduler 38 as controlled by the operator and the MER monitoring module 42. Upon a grant request (GR) arrival at step 66, a determination is made at step 68 whether or not the selected mode of operation is "high-resilience" mode. If it is the "high-resilience" mode, then all allocations for the grant requests are made in the "high-resilience" mode i.e. mutually exclusive timeslot allocations. If the selected mode of operation in step 68 is not "high-resilience", a determination is made at step 69, whether the operator selected "high throughput with selected protection" for predefined transmissions. If "high throughput with selected protection" mode of operation is selected, then a decision is made in step 70 as to whether or not the GR belongs to the predefined type or class of upstream transmission. If it does, then the all subsequent grant allocations for this GR are allocated in the "high-resilience" mode. In the example illustrated in FIG. 6, if an operator selects "high throughput with selected protection" mode of operation, mutually exclusive allocations are provided for the stated type of upstream transmissions in multiple timeslots. In case of an Unsolicited Grant service for a voice flow, all future allocations for the voice flow from the requested R-CM would be ensured to provide mutually exclusive allocations in the subsequent DOCSIS MAPs which include the grant for the requesting R-CM. However, other types of upstream transmissions are not necessarily allocated in a mutually exclusive manner as discussed below.

By way of example, at step 69 if the "high throughput with selected protection" is not selected for use, a decision is made at step 72 using the information from the MER monitoring module 42 to determine whether or not the auxiliary scheduler 38 should allocate timeslots based on the "high resilience" mode (mutual exclusive allocations) or a "high throughput" mode in which overlapping timeslot allocations are permitted for at least some non-interfering cable modems (R-CMs). For this purpose, the module 42 can compare the current measured codeword error rate (CER) versus a predetermined acceptable threshold level ($CER_{th}$). If the CER is acceptable and below the threshold at step 72, the auxiliary scheduler 38 permits allocations via the "high throughput" mode at step 74. If not, the auxiliary scheduler 38 is toggled to allocation via the "high resilience" mode at step 76.

In addition to the above described schedulers and modules of the CMTS 34, the CMTS 34 can further include an R-CM Locator Module 78 as shown in FIG. 3. The R-CM locator module 78 works in conjunction with the MER monitoring module 42 to identify which cable modems (R-CMs) served by the CMTS 34 are associated with R-ONUs providing optical upstream signals at overlapping wavelengths. Since not all optical signals from R-ONUs associated with R-CMs have overlapping or closely-spaced wavelengths, the R-CM locator module 78 is able to identify and group non-interfering R-CMs and provide this information to the auxiliary scheduler 38.

By way of example, during normal timeslot allocation and transmissions, the MER monitoring module 42 monitors for modulation errors when two or more R-CMs are allocated overlapping timeslots. The results can be forwarded to the R-CM locator module 78. If the transmission is considered successful, the R-CM locator module 78 can record that the allocated R-CMs are non-interfering, and this information can be checked by the auxiliary scheduler 38 in advance of future allocations.

By way of further example, the R-CM locator module 78 and the MER monitoring module 42 can take advantage of certain "free" timeslots to run identification procedures. Here, the CMTS 34 prompts a set of two or more R-CMs to simultaneously transmit data in the return path. The R-ONUs of the R-CMs convert the transmissions to optical signals which are received by the optical receiver at the headend. The MER monitoring module 42 monitors for preamble losses during this timeslot and this information is saved by the R-CM locator module 78. From a collection of this information, the R-CM locator module 78 employs a searching technique to identify and segregate interfering R-CMs into separate lists or "bins" or a matrix. Each "bin" contains one or more R-CMs that are coupled behind R-ONUs operating at non-overlapping or significantly spaced-apart wavelengths. Thus, the auxiliary scheduler 38 is quickly provided with information as to which R-CMs can be allotted overlapping timeslots with which other R-CMs by referring to the contents of the "bins" or lists created by the R-CM locator module 78. The above referenced identification procedure can also be used to periodically prompt a set of two or more R-CMs that are believed to be "interfering" to simultaneously transmit data in the return path to confirm whether or not these R-CMs remain "interfering". In this manner, the "bins" or list can be periodically updated with respect to whether the R-CMs remain interfering relative to one another or whether they are no longer "interfering" and can be allotted overlapping timeslots.

Figure 7:
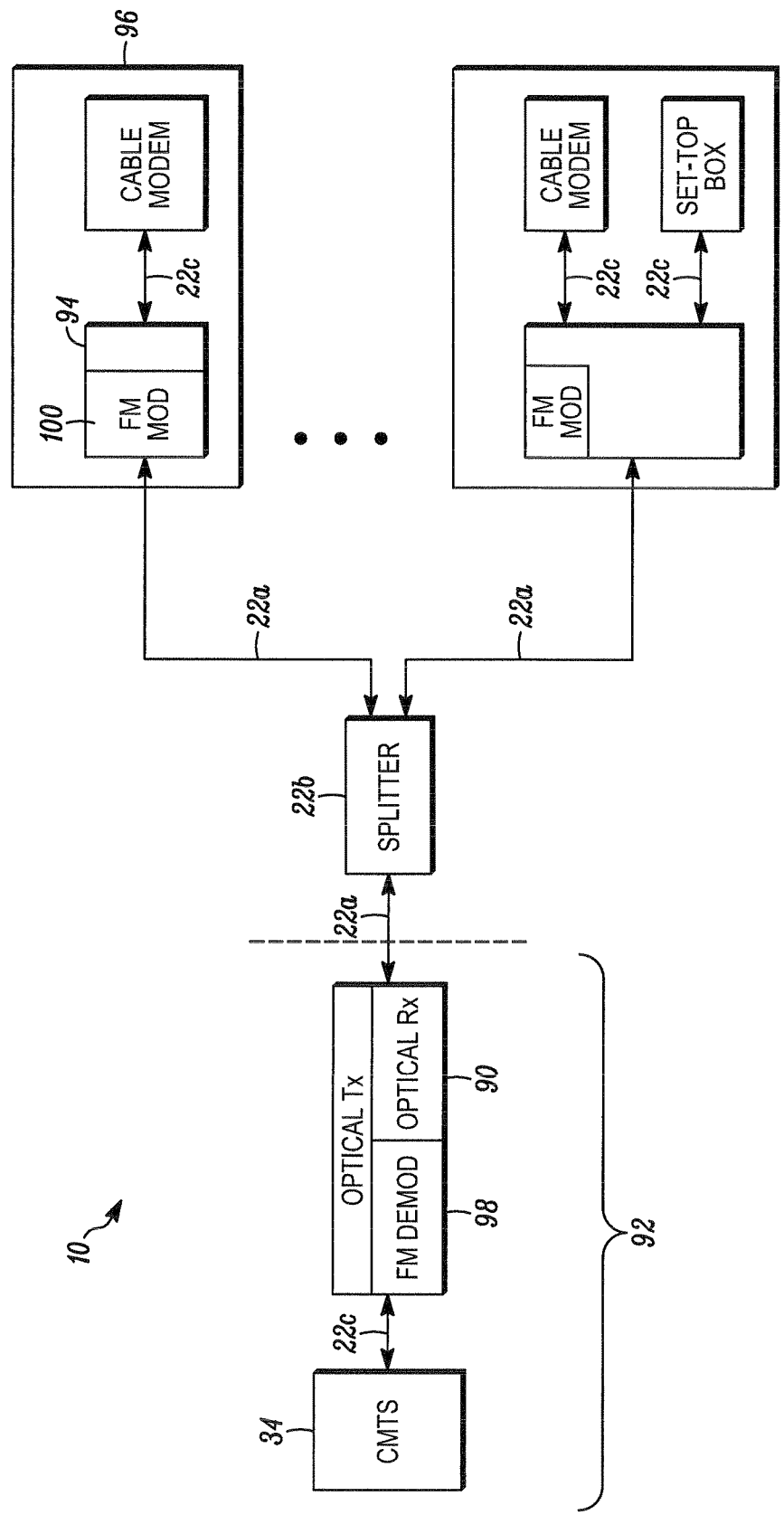
FIG. 7 is a block diagram of an alternate Radio Frequency over Glass (RFoG) network.

As opposed to using amplitude modulation (AM) in the upstream path in the systems primarily discussed above, it is also possible to use frequency modulation (FM) in the upstream path. In this case, the upstream optical receiver 90 at the headend or hub 92 and the R-ONU 94 at the subscriber location 96 will include a frequency modulator 100 and a frequency demodulator 98, respectively, as shown in FIG. 7. For this system, the MER monitoring module 42 can be used to perform an additional task of accurately identifying which customer network elements, such as set-top boxes (STBs) and cable modems, are coupled behind the same R-ONU. For this purpose, the module 42 can invoke selected cable modems, set-top boxes, or other customer network elements to generate simultaneous upstream transmissions to the module 42, such as during a period of low utilization of the network. When frequency modulation (FM) techniques are used in the upstream path, cable modems behind different R-ONUs will cause upstream interference. In contrast, a successful transmission indicates that the selected STBs and/or cable modems are deemed to be coupled behind the same R-ONU.

Based on the above obtained information, the auxiliary scheduler 38 is provided with information concerning which network elements are behind the same R-ONU. Accordingly, the auxiliary scheduler 38 can grant overlapping timeslots to all transmitting devices or network elements behind the same R-ONU without fear of interference.

The CMTS discussed above can physically be provided as a card, circuit board, or electronic device and can include various modules, processors, microprocessors, controllers, chips, units and the like. It will be apparent to one of ordinary skill in the art that the modules, processors, controllers, units and the like may be implemented as electronic components, software, hardware or a combination of hardware and software. For example, the modules and schedulers of the CMTS 34 discussed above can be implemented in software by a processor such as a microprocessor or a digital signal processor or any other suitable electronic device. The functions of the CMTS can also be implemented in any suitable hardware and/or by multiple pieces of hardware located in different locations. In addition, the schedulers and modules discussed above can be provided as separate modules within the CMTS or can be integrated together such that the one module performs multiple functions. Also, it will be apparent to one of ordinary skill in the art that the CMTS 34 can be a stand-alone device connected to the network or can be integrated into any other device connected to the network.

While the principles of the invention have been described above in connection with specific devices, systems, and methods, it is to be clearly understood that this description is made only by way of example and not as limitation on the scope of the invention as defined in the appended claims.

We claim:

1. A headend communications device for communicating via a network to downstream network elements coupled behind optical network units and for allocating and granting timeslots for upstream transmissions originating from the network elements, comprising:
   a scheduler for managing and controlling timeslot allocations for the network elements in a manner minimizing upstream interference with respect to the upstream transmissions, said scheduler identifying two or more of the network elements served by the headend communications device that are coupled behind optical network units that if permitted to simultaneously send optical upstream transmissions in a return path on the network will cause at least a pre-determined intolerable level of upstream interference, and said scheduler preventing said two or more network elements from being allocated and granted overlapping timeslots; and
   a wavelength estimation module that estimates a transmit wavelength for optical network units associated with each network element, estimates an expected level of interference resulting from overlapping allocations of timeslots from network elements based on the transmit wavelength estimates, and provides this information to said scheduler.

2. A headend communications device according to claim 1, wherein, in at least one mode of operation of the device, said scheduler prevents the network elements coupled behind different optical network elements from being allocated and granted overlapping timeslots for at least one defined type or class of upstream transmission.

3. A headend communications device according to claim 1, wherein, in at least a high-throughput mode of operation of the device, said scheduler identifies two or more non-interfering network elements coupled behind optical network units that if permitted to simultaneously send optical upstream transmissions in a return path on the network will not cause the pre-determined intolerable level of upstream interference and permits allocation and granting of overlapping timeslots for said two or more non-interfering network elements coupled behind optical network units.

4. A headend communications device according to claim 1, wherein said wavelength estimation module is adapted to receive communications from optical network units concerning lasers of the optical network units.

5. A headend communications device according to claim 1, further comprising a monitoring module that monitors at least one of modulation error rate, bit error rate, codeword error rate, preamble losses, RF spectrum, and optical spectrum for overlapping upstream transmissions from two or more of the network elements and identifies at least one of sets of the network elements that cause at least one of modulation errors, bit errors, codeword errors, preamble losses, and upstream interference when allocated with overlapping timeslots and sets of the network elements that do not cause at least one of modulation errors, bit errors, codeword errors, preamble losses, and upstream interference when allocated with overlapping timeslots.

6. A headend communications device according to claim 5, wherein, based on a measured amount of modulation errors by said modulation error monitoring module, said modulation error monitoring module toggles an operation mode of said scheduler between a high-throughput mode permitting allocation of overlapping timeslots for upstream transmissions from network elements and a high-resilience mode requiring mutually exclusive allocation of timeslots for upstream transmissions from network elements.

7. A headend communications device according to claim 5, wherein said modulation error monitoring module is adapted to invoke selected network elements to transmit upstream during test periods and monitors modulation errors.

8. A headend communication device according to claim 1, further comprising a locater module for providing information on the network elements to said scheduler and for categorizing at least one of sets of network elements that will potentially interfere with each other if allocated with overlapping timeslots and sets of network elements that are not expected to interfere with each other if allocated with overlapping timeslots.

9. A cable modem termination system (CMTS) for communicating with downstream network elements via a network at least partly formed of a RF-over-Glass (RFoG) network operating under Data Over Cable Service Interface Specification (DOCSIS) standards and for allocating and granting timeslots for upstream transmissions from the downstream network elements, comprising:
   at least one scheduler granting timeslot allocations of upstream transmissions for the downstream network elements served by the CMTS for at least one upstream RF channel and managing and controlling timeslot allocations for network elements coupled to optical network units connected to the RFoG network;
   said at least one scheduler preventing interference as a result of overlapping timeslots for upstream transmissions from two or more of the network elements coupled behind different optical network units by preventing said two or more of the network elements from being allocated and granted with overlapping timeslots; and
   a wavelength estimation module that estimates transmit wavelength of the optical network unit associated with each network element, estimates an expected level of optical beat interference resulting from simultaneous transmission from two or more of the optical network units associated with selected network elements based on the transmit wavelength estimates, and that provides this information to said at least one scheduler.

10. A CMTS according to claim 9, wherein said at least one scheduler is in a form selected from the group consisting of software loaded in at least one processor of the CMTS and hardware.

11. A CMTS according to claim 9, wherein, in at least a high-resilience mode of operation of said at least one scheduler, said at least one scheduler prevents network elements from being allocated with overlapping timeslots for at least pre-selected types or classes of upstream transmissions, and in at least a high-throughput mode of operation of said at least one scheduler, said at least one scheduler identifies two or more non-interfering network elements coupled to different optical network units that if permitted to simultaneously send optical upstream transmissions in a return path on the network will not cause said interference and permits allocation and granting of overlapping timeslots for said two or more non-interfering network elements coupled to different optical network units.

12. A CMTS according to claim 9, further comprising a modulation error monitoring module that monitors at least one of modulation error rate, bit error rate, codeword error rate, and preamble losses for overlapping upstream transmissions via two or more of the optical network units associated with the network elements, identifies at least one of sets of the network elements that cause modulation errors when allocated with overlapping timeslots and sets of the network elements that do not cause modulation errors when allocated with overlapping timeslots, and toggles an operation mode of said at least one scheduler based on a measured amount of modulation errors between a high-throughput mode permitting allocation of overlapping timeslots for upstream transmissions from the network elements and a high-resilience mode requiring mutually exclusive allocation of timeslots for upstream transmissions from the network elements.

13. A CMTS according to claim 12, wherein said modulation error monitoring module invokes selected network elements to transmit upstream during test periods and monitors modulation errors.

14. A CMTS according to claim 9, wherein said at least one scheduler categorizes at least one of sets of network elements that will potentially interfere with each other if allocated overlapping timeslots and sets of network elements that are not expected to interfere with each other if allocated with overlapping timeslots.

15. A method of preventing an intolerable amount of interference resulting from return path optical transmissions from network elements via an RF-over-Glass (RFoG) network operating under Data Over Cable Service Interface Specification (DOCSIS) standards, comprising the steps of:
   classifying with a scheduler of a cable modem termination system (CMTS) at least one of a set of network elements served by the CMTS and coupled to the RFoG network via optical network units causing a pre-determined intolerable level of interference when allocated overlapping timeslots and a set of network elements served by the CMTS and coupled to optical network units not causing a pre-determined intolerable level of interference when allocated overlapping timeslots;
   estimating a transmit wavelength of the optical network unit associated with each network element;
   estimating an expected level of optical beat interference resulting from simultaneous transmission from two or more of the optical network units associated with selected network elements based on the transmit wavelength estimates; and
   preventing with the scheduler the CMTS from granting an allocation of overlapping timeslots to two or more of the network elements that will cause at least the pre-determined intolerable level of interference when permitted to transmit simultaneously.

16. A method according to claim 15, further comprising the step of toggling the scheduler between a first mode of operation in which the scheduler prevents an allocation grant of any overlapping timeslots for network elements coupled to the optical network units and a second mode of operation in which the scheduler permits the scheduler to grant allocation of overlapping timeslots to network elements coupled to the optical network units.

17. A method according to claim 16, wherein, in said second mode of operation, the scheduler grants allocation of overlapping timeslots only to network elements having optical network units with transmit wavelengths that are sufficiently spaced apart as to not cause the pre-determined intolerable level of interference.

18. A method according to claim 15, further comprising at least one of the steps of estimating expected transmit wavelength for the network elements coupled to optical network units and measuring modulation errors of upstream optical transmissions received simultaneously from two or more of the network elements coupled to optical network units.

19. A method according to claim 15, wherein frequency modulation is used for the return path optical transmissions, and further comprising a step of determining whether selected network elements are coupled behind the same optical network unit by using the CMTS to cause the selected network elements to send a return path transmission during a test and by determining with the CMTS whether there is no interference which indicates that the selected network elements are coupled behind the same optical network unit.

* * * * *